United States Patent
Joly et al.

(10) Patent No.: US 10,140,692 B2
(45) Date of Patent: Nov. 27, 2018

(54) TIRE IMAGE RECTIFYING METHOD

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Alexandre Joly, Clermont-Ferrand (FR); Jean-Paul Zanella, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 21 days.

(21) Appl. No.: 15/317,469

(22) PCT Filed: Jun. 12, 2015

(86) PCT No.: PCT/EP2015/063222
§ 371 (c)(1),
(2) Date: Dec. 9, 2016

(87) PCT Pub. No.: WO2015/189412
PCT Pub. Date: Dec. 17, 2015

(65) Prior Publication Data
US 2017/0148146 A1 May 25, 2017

(30) Foreign Application Priority Data
Jun. 13, 2014 (FR) ...................................... 14/55400

(51) Int. Cl.
*G06K 9/00* (2006.01)
*G06K 9/44* (2006.01)
(Continued)

(52) U.S. Cl.
CPC ............ *G06T 5/006* (2013.01); *G06K 9/4604* (2013.01); *G06T 5/20* (2013.01); *G06T 7/001* (2013.01);
(Continued)

(58) Field of Classification Search
USPC ...................... 382/141, 266; 73/146; 702/150
See application file for complete search history.

(56) References Cited

U.S. PATENT DOCUMENTS 9,002,063 B2 * 4/2015 Joly .................... G01M 17/027
                                                            382/103
9,002,130 B2   4/2015 Noyel et al. ........ G01M 17/027
(Continued)

FOREIGN PATENT DOCUMENTS

| CN | 100464346 C   | 2/2009  |
|----|---------------|---------|
| FR | 2 966 245 A1  | 4/2012  |
| JP | 2008-309646 A | 12/2008 |

OTHER PUBLICATIONS

International Search Report issued by WIPO dated Nov. 4, 2015, in connection with International Application No. PCT/EP2015/063222 (with English translation attached).
(Continued)

*Primary Examiner* — Kathleen Y Dulaney
(74) *Attorney, Agent, or Firm* — Fitzpatrick, Cella, Harper & Scinto

(57) ABSTRACT

A method of rectifying an image representing a surface of a tire is provided. According to the method, a circumferential marking present on a tire is detected in an image of the tire. Based on the marking, and for each line of a plurality of lines of the image, a reference position on the tire is determined. For each of the lines of the image, a difference between the reference position on the line under analysis and a minimum value of the reference positions for all of the lines of the
(Continued)

image is determined. For each of the lines of the image, pixels of the line under analysis are radially offset by a value of the difference.

16 Claims, 1 Drawing Sheet

(51) Int. Cl.
    *E01C 23/00*     (2006.01)
    *G01C 9/00*     (2006.01)
    *G06T 5/00*     (2006.01)
    *G06K 9/46*     (2006.01)
    *G06T 7/73*     (2017.01)
    *G06T 7/00*     (2017.01)
    *G06T 5/20*     (2006.01)

(52) U.S. Cl.
    CPC ...... *G06T 7/73* (2017.01); *G06T 2207/30108* (2013.01)

(56) References Cited

U.S. PATENT DOCUMENTS

| | | | | |
|---|---|---|---|---|
| 9,008,368 B2 * | 4/2015 | Joly | ...................... | G06T 7/0002 382/104 |
| 9,025,853 B2 * | 5/2015 | Noyel | ...................... | G06T 5/30 382/141 |
| 9,123,112 B2 * | 9/2015 | Vinciguerra | ......... | G06K 9/6204 |
| 9,224,198 B2 | 12/2015 | Zanella et al. | ......... | G06T 7/0008 |
| 9,230,318 B2 | 1/2016 | Zanella et al. | .......... | G06T 7/001 |
| 9,230,337 B2 | 1/2016 | Zanella et al. | .......... | G06T 7/408 |
| 2006/0181610 A1 * | 8/2006 | Carlsson | ............ | H04N 5/23238 348/159 |
| 2006/0209102 A1 * | 9/2006 | Jones | ...................... | B41J 3/4071 347/4 |
| 2009/0320581 A1 * | 12/2009 | Angell | ................... | G01B 11/22 73/146 |
| 2010/0312109 A1 * | 12/2010 | Satoh | ...................... | A61B 8/06 600/441 |
| 2011/0069323 A1 | 3/2011 | Takahashi et al. | | |
| 2011/0288814 A1 * | 11/2011 | Mizutani | ............ | G01B 11/2522 702/150 |
| 2013/0202156 A1 * | 8/2013 | Joly | ...................... | G01M 17/027 382/104 |
| 2013/0266189 A1 * | 10/2013 | Vinciguerra | ......... | G06K 9/6207 382/104 |
| 2014/0283591 A1 * | 9/2014 | Takahashi | ............ | G01B 11/245 73/146 |
| 2015/0254829 A1 * | 9/2015 | Araki | ..................... | G01B 11/24 382/141 |
| 2016/0133000 A1 | 5/2016 | Bourgeois et al. | ..... | G06T 7/001 |

OTHER PUBLICATIONS

R. Szeliski, "Image Alignment and Stitching: A Tutorial," Microsoft Technical Report MSR-TR-2004-92, pp. 1-82 (2004), https://www.microsoft.com/en-us/research/wp-content/uploads/2004/10/tr-2004-92.pdf.

* cited by examiner

TIRE IMAGE RECTIFYING METHOD

FIELD OF THE INVENTION

The invention concerns the field of tire manufacture, and more particularly the field of visual inspection of tires during or at the end of the production process.

RELATED ART

Visual inspection of tires has been broadly developed in the tire industry and still most often relies on the skill of the operators in charge of detecting any visible imperfections at the surface of the tire. Now, with advances in the processing power of computer equipment, manufacturers are beginning to see the possibility of performing these inspection jobs automatically.

For this purpose, various means of illumination and digital imaging are used to acquire images of the tires, for the purpose of a subsequent digital processing which is able to detect the imperfections formerly detected visually by the operators.

These imaging means make it possible to take various snapshots of images, whether in two dimensions or in three dimensions, of the inner and/or outer surface of the tire being inspected.

In order to inspect the totality of this surface, mechanical means are provided, making it possible to place the tire in rotation with respect to the image photographing devices. For example, means are known such as a plate on which the tire is placed on its side. The plate is placed in rotation in order to allow the acquisition, for example, of an image of the bead portion of the tire being inspected. There is also known a tire guidance system consisting of rollers placed in rotation.

It has now been discovered that, during these imaging techniques, imperfections not present on the tire appear in the acquired image, thus possibly falsifying the detection, since there is a risk of confusion between the deformations intrinsic to the tires and the deformations produced during the image acquisition.

Several possible causes of these imperfections have been identified. On the one hand, the mechanical system driving the rotation of the tire may produce an imperfect rotation movement, thus causing an offset between the tire and the acquisition system. On the other hand, a tire is not a rigid object, especially when it is not inflated, and imperfections of curvature may thus appear during the acquisition.

The possibility of improving the mechanical characteristics of the machines used for the rotation guidance of the tires has been contemplated, but such improvements are very costly, and furthermore they are not able to correct the imperfections caused by movements of the non-inflated casing.

Thus, the purpose of the present invention is to propose a method which can correct all of the aforementioned imperfections caused by the acquisition process.

BRIEF DESCRIPTION OF THE INVENTION

For this purpose, the present invention proposes a method of rectification of the image of a tire immediately after acquisition, and before other digital detection processing is applied.

Thus, the invention concerns a method of rectifying an image representing the surface of a tire, comprising the following steps:

one detects, in the image, a circumferential marking present on the tire, one determines, on the basis of this marking and for each line of the image, a position reference on the tire, one determines, for each line of the image, the difference between the reference position on the current line and the minimum value of the reference positions for all of the lines of the image, and the pixels of each of the lines are radially offset by the value of this difference.

This method of rectification can be used advantageously for the rectification of an image acquired on the bead portion of a tire casing. However, it can be implemented for any portion of the sidewall of a tire casing, as long as it has a circumferential marking.

In fact, in one embodiment, it is useful that the circumferential marking is an element present on the entire circumference of the tire, and centered with regard to the axis of rotation of a device used to support and rotate the tire during the acquisition of the image being rectified.

Although the invention is not limited to the processing of images acquired on the sidewall of casings, it finds a particularly interesting application there, since it is these images which generally present the defects mentioned at the beginning of the present application.

In one embodiment, the circumferential marking has particular geometrical properties falling within the group comprising: a bump, a cavity, a width, a depth, a hue.

In one advantageous embodiment, the detection step involves a filtering step which implements a contour filter. One will preferably select a Sobel filter, but one could just as well utilize other contour filters, such as a Prewitt filter or a Freeman filter. These filters are known to the skilled person, and their use in the present invention shall be detailed below.

In one embodiment, the detection step further involves one or more steps among the following: a step of verification of consistency, a data smoothing step, and an interpolation step.

In fact, it is possible that the image to which the method is applied has defects created during the acquisition. Thus, it is useful to perform a verification of consistency between the different lines of the image, to verify the image continuity. It is likewise useful to provide for a smoothing step in the event that aberrant values are present in the image. It is likewise useful to provide an interpolation step in order to create data in the event that one or more holes are found in the image.

BRIEF DESCRIPTION OF THE FIGURES

Other objectives and advantages of the invention will emerge clearly from the following description of a preferred but nonlimiting embodiment, illustrated by the following figures in which.

DESCRIPTION OF THE BEST EMBODIMENT OF THE INVENTION

Figure 1:
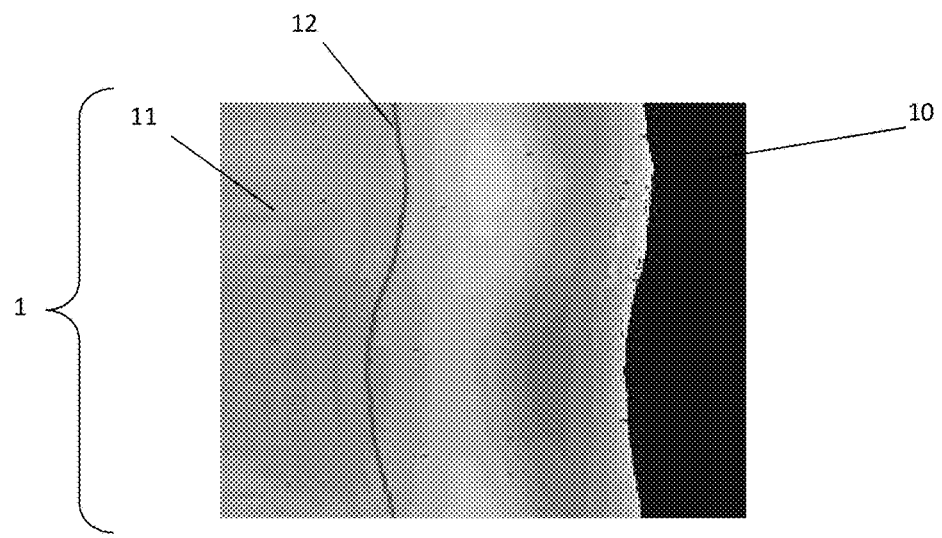
FIG. 1 shows an image which is going to be rectified by the use of a method according to the invention.

FIG. 1 shows an image 1 acquired on the bead portion of a tire casing. The zone 10 represents the background, and the zone 11 represents the bead proper. This image was acquired in three dimensions, but a method according to the invention can just as well be applied to an image acquired in two dimensions.

One sees in this image a longitudinal element 12 representing a marking element present on the bead represented in this image. A method according to the invention can be applied to any image having such a circumferential marking, whether a centring cord, a knurled zone, or any other element.

In the present case, the marking element was a centering cord with a thickness between five and six tenths of a millimeter, and width between seven and ten tenths of a millimeter, thus forming a relief. One notes in the image that this centering cord is deformed. This deformation may be caused by the image acquisition system, or it may be intrinsic to the tire.

The first step of a method according to the invention consists in detecting this circumferential marking on the acquired image. For this purpose, the circumferential marking is treated as a contour, and one will therefore search for contours of the image having a rectilinear form oriented in the circumferential direction and an axial orientation.

The search for contours can be advantageously done with the help of digital image processing algorithms. These algorithms are based on the observation that the levels of intensity of light or colour vary in significant manner when one moves from one image object to another. One will thus search for image points around which there is a rapid change from light to dark and which correspond most likely to contours, as well as the orientation of these contours.

In mathematical terms, the gradient of a function of two variables (in the present case, the intensity of the grey level or colour as a function of the image coordinates) is a vector of dimension 2 whose coordinates are the derivatives in the axial and circumferential directions. At each point or pixel, the gradient points in the direction of the strongest change in intensity, and its length represents the rate of variation in this direction. In the area of the contour, the gradient crosses the contour from darker intensities to the brightest intensities.

Among the most popular algorithms, one will opt for the use of filters, which are matrix operators whose purpose is to perform a convolution between the image considered as a matrix of numerical values and a convolution mask or filter likewise presenting itself as a matrix.

Although all of the algorithms may be suitable, it appears that the Sobel algorithm is the one with the most advantage due to the relative ease of its implementation and its ability to overcome a substantial noise level, which is particularly interesting in the present case on account of the low contrast of the trace forming the boundary between two elements.

The filtering, for example with a Sobel filter, makes it possible to detect peaks in value on the image, these peaks corresponding to the particular marking. Before proceeding with the rectification, and as previously mentioned, it is sometimes useful to carry out several image correction steps, such as a consistency processing, a smoothing, or an interpolation.

Thus, to verify the consistency between the lines, one applies to the image a morphological filter of dilatation type with a structuring element of rectangular shape, oriented in the vertical direction, such as a rectangular structuring element preferably having a width of 5 pixels and a height of 20 pixels. This filter makes it possible to link up the elements which are vertically aligned and to replace the missing values of less than 20 pixels length, in the event that the objects are aligned or very close vertically, for example, spaced apart by less than 5 pixels or so.

In the event that several objects emerge from this processing, one performs a filtering of the aberrant values, which consists in selecting the object which is connected to the start and end of the image and the first one by default.

After these correction steps, one determines for each line of the image a position reference on the tire. In one particular example, this position reference corresponds, for example, to the distance between the minimum value of the marking element on a line and the left edge of the image.

One then determines the difference between the reference position on the current line and the minimum value of the reference positions for all of the lines of the image. One chooses to use the minimum value here for several reasons. On the one hand, this makes it possible to have an always positive difference, and thus to simplify the implementing of the following step. On the other hand, it has been found that if one uses the mean value, for example, this value might be affected by large defects in the image, which would thus have an impact on the rectification of all of the lines.

Moreover, it has been found that it is easier to use the minimum value rather than the maximum value, because an offsetting in the direction of the maximum value would result in a loss of a portion of the image, which would then require a readjustment of the image. This would make the image processing more complicated and slower.

Figure 2:
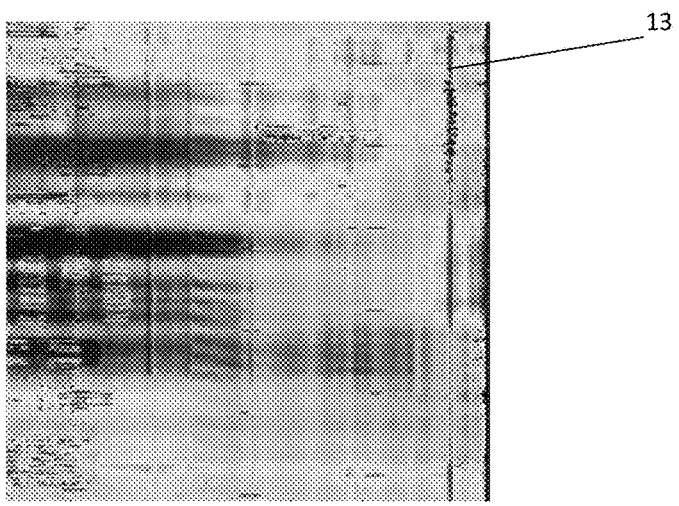
FIG. 2 shows the image of FIG. 1 after rectification by a method according to the invention, flattened out.

The last step in the method according to the invention then consists in radially offsetting each of the pixels of the image by the corresponding difference value for the line to which the pixel belongs. One thus notices, in FIG. 2, that after the implementing of a method according to the invention the marking element 13, which was deformed in FIG. 1, has now been rectified and is thus rectilinear.

The implementing of such a method can thus provide an image of good quality, to which other processing could be applied under good conditions. It will thus be possible to:
slice the image into several rectangular zones on which specific processing can be carried out, making it possible to simplify the calculation operations and reduce the processing time,
simplify the operations of justification and deformation in order to compare an image with other acquisitions,
detect rubber burr or specific tire defects which appear on the rubber edge.

It should be noted that the present invention proves to be particularly effective when the acquisition of the image being rectified has been carried out previously under good conditions. Thus, one will preferably choose an acquisition in three dimensions, which is more effective for detecting markings in relief.

In the case of an acquisition in two dimensions, one will make sure to utilize a raking lighting, and which takes into account the curvature of the sidewall, in order to effectively detect a marking in relief. For a longitudinal marking, one could use a horizontally oriented raking lighting. For a marking in colour, one will use a lighting in the colour of the marking, which makes it possible to bring this out strongly in the case of an acquisition with a black and white camera.

As compared to the prior art, the present invention is extremely advantageous in that it avoids the need to modify the mechanism of the machine used to perform the acquisition, since one can correct afterwards the defects caused by that machine.

The invention claimed is:
1. A method of rectifying an image representing a surface of a tire, the method comprising steps of:

detecting, in an image of a tire, a circumferential marking present on the tire, the image of the tire being formed of a plurality of lines;

determining, based on the marking and for each of the lines of the image, a reference position on the tire;

determining, for each of the lines of the image, a difference between the reference position on the line under analysis and a minimum value of the reference positions for all of the lines of the image; and, producing a rectified tire image by, for each of the lines of the image, radially offsetting pixels of the line under analysis by a value representing the difference.

2. The method according to claim 1, wherein the marking is an element present on an entire circumference of the tire, and wherein the element is centered with respect to an axis of rotation of a device used to support and rotate the tire during acquisition of the image.

3. The method according to claim 1, wherein geometrical properties of the marking include any one or a combination of: a bump, a cavity, a width, a depth, and a hue.

4. The method according to claim 2, wherein geometrical properties of the marking include any one or a combination of: a bump, a cavity, a width, a depth, and a hue.

5. The method according to claim 1, wherein the detecting step includes filtering the image using a contour filter.

6. The method according to claim 2, wherein the detecting step includes filtering the image using a contour filter.

7. The method according to claim 3, wherein the detecting step includes filtering the image using a contour filter.

8. The method according to claim 4, wherein the detecting step includes filtering the image using a contour filter.

9. The method according to claim 1, wherein the detecting step includes any one or a combination of:
verifying a consistency of the lines of the image,
smoothing aberrant datapoints in the image, and
interpolating a missing datapoint in the image.

10. The method according to claim 2, wherein the detecting step includes any one or a combination of:
verifying a consistency of the lines of the image,
smoothing aberrant datapoints in the image, and
interpolating a missing datapoint in the image.

11. The method according to claim 3, wherein the detecting step includes any one or a combination of:
verifying a consistency of the lines of the image,
smoothing aberrant datapoints in the image, and
interpolating a missing datapoint in the image.

12. The method according to claim 4, wherein the detecting step includes any one or a combination of:
verifying a consistency of the lines of the image,
smoothing aberrant datapoints in the image, and
interpolating a missing datapoint in the image.

13. The method according to claim 5, wherein the detecting step includes any one or a combination of:
verifying a consistency of the lines of the image,
smoothing aberrant datapoints in the image, and
interpolating a missing datapoint in the image.

14. The method according to claim 6, wherein the detecting step includes any one or a combination of:
verifying a consistency of the lines of the image,
smoothing aberrant datapoints in the image, and
interpolating a missing datapoint in the image.

15. The method according to claim 7, wherein the detecting step includes any one or a combination of:
verifying a consistency of the lines of the image,
smoothing aberrant datapoints in the image, and
interpolating a missing datapoint in the image.

16. The method according to claim 8, wherein the detecting step includes any one or a combination of:
verifying a consistency of the lines of the image,
smoothing aberrant datapoints in the image, and
interpolating a missing datapoint in the image.

* * * * *